United States Patent [19]

Otani et al.

[11] Patent Number: 4,504,648

[45] Date of Patent: Mar. 12, 1985

[54] POLYURETHANEUREA AND PROCESS FOR PREPARING THE SAME

[75] Inventors: Kozo Otani, Hyogo; Yoshio Yamada; Hiroyuki Okumura, both of Osaka, all of Japan

[73] Assignee: Toyo Tire & Rubber Company, Limited, Osaka, Japan

[21] Appl. No.: 549,452

[22] Filed: Nov. 7, 1983

[30] Foreign Application Priority Data

Nov. 13, 1982 [JP] Japan .................. 57-199384

[51] Int. Cl.³ .................. C08G 18/32; C08G 18/22; C08G 18/14
[52] U.S. Cl. .................. 528/76; 252/182; 521/164; 528/59; 528/63
[58] Field of Search .................. 521/164; 528/76

[56] References Cited

U.S. PATENT DOCUMENTS

| | | | |
|---|---|---|---|
| 3,817,940 | 6/1974 | Blahak et al. ................ | 528/68 |
| 3,932,360 | 1/1976 | Cerankowski et al. ................ | 528/64 |
| 4,246,392 | 1/1981 | Koike et al. ................ | 528/76 |
| 4,328,322 | 5/1982 | Baron ................ | 528/68 |

*Primary Examiner*—Herbert S. Cockeram

*Attorney, Agent, or Firm*—Murray, Whisenhunt and Ferguson

[57] ABSTRACT

A polyurethaneurea which comprises a polymer obtained by a polyaddition reaction of (a) a polyetherpolyol derivative and (b) an at least 2-valent polyisocyanate, the polyetherpolyol derivative having at least, on average, one terminal amino group in which at least, on average, one hydroxyl group is substituted by a residue of para-aminobenzoic acid ester, and having the general formula

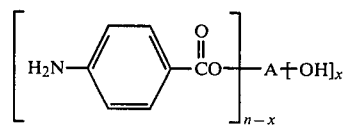

wherein n is an integer of 2 to 8, x is an average value and a positive number of 0.05 n to (n−1), A is an n-valent radical obtained by removal of hydroxyl groups from an n-valent polyoxyalkylenepolyol having a molecular weight of 400 to 10,000.

4 Claims, No Drawings

POLYURETHANEUREA AND PROCESS FOR PREPARING THE SAME

The invention relates to polyurethaneurea which is obtained by a polyaddition reaction of (a) a polyetherpolyol derivative having at least one terminal amino group and (b) a polyisocyanate.

A polyol derivative having amino and hydroxyl groups in the ends of the molecule is reacted with a polyisocyanate to produce a polyurethaneurea containing urea bonds. This polyurethaneurea has many excellent advantages compared with a polyurethane obtained from a polyol and a polyisocyanate. Particularly, the polyurethaneurea of the invention which is prepared by a polyaddition reaction of a polyetherpolyol derivative having at least one terminal amino group and a polyisocyanate has a higher heat resistance and a greater mechanical strength compared with a corresponding polyurethane.

U.S. Pat. No. 4,328,322 discloses a polymer which is prepared by a polyaddition reaction of a para-aminobenzoate of a polyol with a polyisocyanate, the para-aminobenzoate of the polyol being prepared by a reaction of a polyol with para-nitrobenzoic chloride and a reduction of nitro groups to amino groups, and all of the terminal hydroxyl groups of the polyol are replaced by amino-containing groups.

The polyurethaneurea of the invention is obtained by a polyaddition reaction of a polyetherpolyol derivative and a polyisocyanate, the polyetherpolyol derivative being a para-aminobenzoate of a polyetherpolyol in which a part of the terminal hydroxyl groups of the polyol are replaced by amino-containing groups. Thus, the present polymer differs in chemical structure from the polymer disclosed in the above U.S. Pat. No. 4,328,322.

An object of the invention is to provide a polyurethaneurea and a simple process for preparing the same, the process comprising a polyaddition reaction of a polyetherpolyol derivative having amino and hydroxyl groups in the ends of the molecule, and a polyisocyanate.

The present invention provids a polyurethaneurea which comprises a polymer obtained by a polyaddition reaction of (a) a polyetherpolyol derivative and (b) an at least 2-valent polyisocyanate, the polyetherpolyol derivative having at least, on average, one terminal amino group in which at least, on average, one hydroxyl group is substituted by para-aminobenzoic acid ester, and having the general formula

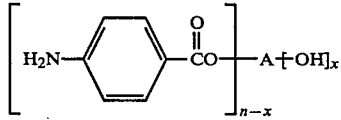

wherein n is an integer of 2 to 8, x is an average value and a positive number of 0.05n to (n−1), A is an n-valent radical obtained by removal of hydroxyl groups from an n-valent polyoxyalkylenepolyol having a molecular weight of 400 to 10,000, and also a process for the production of the above polyurethaneurea.

The polyetherpolyol derivative having at least one terminal amino group used in the invention can be prepared by a simple single-stage process of subjecting a 2- to 8-valent polyoxyalkylenepolyol having a molecular weight of 400 to 10,000 and the alkyl para-aminobenzoate to a transesterification reaction with removing the resulting alcohol.

The polyetherpolyol derivative thus obtained is a partial ester having unreacted hydroxyl groups. The esterification ratio, namely amine conversion ratio may be in a wide range depending on the use. It is essential that at least, on average, one hydroxyl group of the polyetherpolyol is subjected to esterification and the esterification ratio (amine conversion ratio) is preferably about 50 to 95%. Accordingly, the polyetherpolyol derivative used in the invention is prepared preferably by reacting one mole of n-valent polyoxyalkylenepolyol and 0.125n to n mole of alkyl para-aminobenzoate.

Examples of preferable polyoxyalkylenepolyol include 2- to 8-valent polyetherpolyols having a molecular weight of 400 to 10,000. These polyols can be obtained by a known process. For example, these polyols are prepared by adition polymerization of at least one alkylene oxide such as ethylene oxide, propylene oxide, tetrahydrofuran, etc in any order, in the presence of a suitable initiator such as water, low molecular weight polyol or amine, etc.

Examples of useful low molecular weight polyols as an initiator are ethylene glycol, propylene glycol, 1,4-butandiol, 1,6-hexanediol, glycerin, trimethylolpropane, pentaerythritol, sorbitol, sucrose, hydroquinone, 2,2-bis(4-hydroxyphenyl)propane, etc. Examples of useful low molecular weight amines are methylamine, butylamine, ethylenediamine, aniline, tolylenediamine, alkanolamines such as ethanolamine, diethanolamine, triethanolamine, etc.

Among the above polyoxyalkylenepolyols, preferable are 2- to 3-valent polyoxytetramethylene glycol, polyoxypropylenepolyol, polyoxypropylenepolyoxyethylenepolyol, etc having a molecular weight of 1,000 to 4,000, when the resulting polyetherpolyol derivative having at least one terminal amino group of the invention is used as a starting material for an elastomer. Further, 3- to 6-valent polyoxypropylenepolyol, polyoxypropyleneoxyethylenepolyol, etc having a molecular weight of 1,000 to 10,000 are preferable, when the resulting polytherpolyol derivative is used as a starting material for a flexible or semi-rigid cellular plastics. Polyoxypropylenepolyol having 3 to 8 valency and a molecular weight of 400 to 1,500 is preferable, in case the resulting polyetherpolyol derivative is used as a starting material for a rigid resin or cellular plastics.

Examples of useful para-aminobenzoic acid alkyl esters are methyl, ethyl, isopropyl, n-propyl, isobutyl, n-butyl, t-butyl, isoamyl esters of the acid. Especially preferable are methyl and ethyl esters thereof.

The transesterification reaction between the above polyoxyalkylenepolyol and alkyl para-aminobenzoate is carried out with or without a known esterification catalyst, preferably in a stream of an inert gas such as nitrogen. The reaction proceeds usually at 150° to 250° C. with removing an alcohol. Weak acid or weak basic catalyst is preferable which does not produce an ether or olefin by dehydration of a polyol. Examples of useful catalysts are antimony trioxide, lead monoxide and like metal oxide, tetraisopropyl titanate, tetrabutyl titanate and like organic titanium compounds, calcium acetate and like alkaline earth metal salt of weak acids, among these most preferable being organic titanium compounds. The amount of catalyst is usually up to 1000 ppm, preferably up to 100 ppm. An inert solvent and antioxidant such as triphenyl phosphate may be usable in the reaction. The reaction is continued until the distillation of alcohol is completed. The polyetherpolyol derivative is obtained without purification by removing from the reaction mixture the remaining alcohol and, if present, excess of alkyl para-aminobenzoate.

Any of polyisocyanates known in polyurethane chemistry is usable as a polyisocyanate of the invention. Example of useful polyisocyanates include hexamethylene diisocyanate, isophorone diisocyanate, 4,4'-dicyclohexylmethane diisocyanate, 2,4-tolylene diisocyanate(2,4-TDI), 2,6-tolylene diisocyanate(2,6-TDI), 4,4'-diphenylmethane diisocyanate(MDI), carbodiimide-modified MDI, polymethylenepolyphenyl isocyanate(PAPI), ortho-toluidine diisocyanate(TODI), naphthylene diisocyanate(NDI), xylylene diisocyanate(XDI), etc. These isocyanates are useful singly or in admixture of at least two of them.

The polyurethaneurea of the invention can be prepared by any of processes known in polyurethane chemistry, by a polyaddition reaction of the polyetherpolyol derivative having at least one terminal amino group and a polyisocyanate. For example, the polyaddition reaction may be conducted in the presence of an active hydrogen-containing compound which is capable of reacting with isocyanate group. Examples of the active hydrogen-containing compounds are a long-chain polyol, short-chain polyol, short-chain polyamine, water, etc. Further, any of known additives in polyurethane chemistry may be added such as a catalyst, fire retardant, plasticizer, filler, blowing agent, antioxidant, pigment, inert organic solvent, etc.

In case of the production of an elastomer in the invention, it is preferable to conduct the reaction in the presence of a suitable chain extender. The chain extender includes a 2- to 4-valent polyol having a molecular weight of up to 500, diamine having a primary or secondary terminal amino group and a molecular weight of up to 500. Preferable chain extenders are for example:

(a) ethylene glycol, diethylene glycol, 1,2-propylene glycol, dipropylene glycol, 1,4-butanediol, 2,3-butanediol, 1,3-propylene glycol, 1,6-hexanediol, glycerin, trimethylolpropane, 1,4-cyclohexanediol, 1,4-cyclohexanedimethanol, meta-xylylene glycol, para-xylylene glycol and like polyols, (b) hydrazine, ethylenediamine, tetramethylenediamine, hexamethylenediamine, 1,4-cyclohexanediamine, ortho-phenylenediamine, meta-phenylenediamine, para-phenylenediamine, meta-xylylenediamine, 2,4-tolylenediamine, 4,4-diaminodiphenylmethane, 3,3'-dichloro-4,4'-diaminodiphenylmethane, 1,4-dichloro-3,5-diaminobenzene, 1,3-propanediol-di-para-amino benzoate and like diamines, (c) ethanolamine, diethanolamine, triethanolamine, and like alkanolamines, (d) a polyol having a molecular weight of up to 500 and obtained by the addition of propylene oxide and/or ethylene oxide to the above polyols, diamines, alkanolamines or to hydroquinone, pyrogallol, 4,4'-isopropylidenediphenol or aniline, in any order.

Among the above, preferable are diamines which especially enhance the effect of the invention.

The polyaddition reaction of the polyetherpolyol derivative having at least one terminal amino group and the polyisocyanate is preferably conducted under an isocyanate index of 95 to 120. The reaction is conducted in a similar manner in the presence of an another active hydrogen-containing compound. The polyetherpolyol derivative is usually reacted with a molten polyisocyanate at room temperature or around a melting temperature of polyisocyanate. The reaction can be carred out at room temperature when using a polyisocyanate which is liquid at room temperature. In case of using a high molecular weight polyol, chain extender and/or blowing agent, these compounds are preferably dissolved in the polyetherpolyol derivative prior to use. The reaction can be conducted by a prepolymer method. For example, a part or all of the polyetherpolyol derivative is reacted with an excess of the polyisocyanate to prepare a prepolymer having a terminal isocyanate group, and then the prepolymer is reacted with the remaining polyetherpolyol derivative and/or the chain extender. In this case, the prepolymer is preferably used as heated at more than 60° to 80° C. or as dissolved in an inert solvent, in order to decrease a viscosity and improve the handling thereof. Further, in case of preparing an elastomer by casting the present polyurethaneurea, a mold is preferably heated usually at 50° to 100° C. When obtaining a cellular plastic, the reaction is conducted in the presence of a blowing agent such as water, monochlorotrifluoromethane and like low boil compounds.

The polyaddition reaction of the present polyetherpolyol derivative having at least one terminal amino group with the polyisocyanate has a higher reactivity and proceeds more moderately, compared with that of a corresponding polyetherpolyol having no terminal amino group with the polyisocyanate. It is presumed that the above is due to the fact that an amino group is more reactive than a hydroxyl group, and that the reactivity of the amino group which links with an ester group via an aromatic ring in para-position is moderately restrained by electronic substituent effect of the ester group. In case the terminal amino group is an aliphatic amino group or an aromatic amino group having no substituent effect, the polyaddition reaction with an isocyanate compound proceeds very rapidly and is difficult to control, thus the reaction is limited to, for example, in the use in the presence of an organic solvent. The polyaddition reaction of the invention is highly usable in practical use, since the polyaddition reaction has a proper reactivity. The present polyurethaneurea has an excellent heat resistance and mechanical strength due to the structure thereof, and is quite different from the conventional polyurethane.

The invention will be described in detail with reference to the following Examples and Comparison examples.

EXAMPLE 1

Into a three-necked flask were placed 545 g (0.364 mole) of polyoxytetramethylene glycol (trade name, PTMG 1500, MW 1498, a product of Mitsubishi Chemical Industries Ltd.), 120 g (0.728 mole) of ethyl para-aminobenzoate (Reagent grade, a product of Nakarai Chemical Co., Ltd.) and 0.033 g of tetrabutyl titanate. The mixture was heated under a stream of dry nitrogen gas. Ethanol began to be distilled at 180° C. The temperature was gradually increased and the distillation of ethanol stopped at 200° C. in an amount of 82% of the theoretical amount. The mixture was further maintained at 215° C. for 2 hours. Unreacted ethyl para-aminobenzoate was distilled off under a reduced pressure to obtain 622 g of a polyetherpolyol derivative which is a light yellow liquid having a viscosity of 6200 cps at 27° C.

An amine value of the product was 1.045 meq/g by a titration with use of perchloric acid in glacial acetic acid according to Handbook of Japan Analytical Chemistry, third edition, page 261. A total amount of amino group and hydroxyl group was 1.172 meq/g by hydroxyl value measuring method (JIS K 1557). Analysis of the product with gel permeation chromatography showed no free ethyl para-amino-benzoate. The product is identified by a single peak and the distribution of molecular weight is almost same as that of the starting PTMG 1500. Accordingly, 89.2% of terminal hydroxyl group of PTMG 1500 was converted to amino group.

A 170 g quantity of the above polyetherpolyol derivative was heated to 50° C. A 36.4 g quantity of 4,4'-diphenylmethane diisocyanate (MDI, Millionate MT, a product of Nihon polyurethane Co., Ltd.) was melted at 50° C. These two components were mixed together for 30 seconds in a propellor agitator. The mixture was degassed for one minute in a vacuum desiccator and then poured into an iron mold heated at 55° C. The pot life thereof was 8 minutes. The mold was placed in an oven of 110° C. for one hour. Then, a platy elastomer having a thickness of 2 mm was obtained after demolding and curing at 120° C. for 3 hours. The elastomer was aged at room temperature for 7 days and then properties thereof were measured according to JIS K 6301. The results were shown in Table 1.

EXAMPLE 2

An elastomer was prepared in the same manner as in Example 1 with use of a mixture of 150 g of the polyetherpolyol derivative prepared in Example 1 and 11.7 g of 3,3'-dichloro-4,4'-diaminodiphenylmethane (Cureamine MT, a product of Ihara Chemical Co., Ltd.) maintained at 50° C., and 34.6 g of a molten MDI of 50° C. The pot life was 6 minutes. The results were given in Table 1.

EXAMPLE 3

An elastomer was prepared in the same manner as in Example 1 with use of a mixture of 140 g of the polyetherpolyol derivative prepared in Example 1 and 21.9 g of 3,3'-dichloro-4,4'-diaminodiphenylmethane maintained at 50° C., and 41.3 g of a molten MDI of 50° C. The pot life was 3 minutes. The results were given in Table 1.

COMPARISON EXAMPLE 1

In order to compare with Example 3, the reaction is conducted by a so-called one-shot process with use of PTMG 1500, 3,3'-dichloro-4,4'-diaminodiphenylmethane and MDI to compare an elastomer. However, an excellent elastomer was not obtained. It is considered that there is a great difference between a reaction velocity of polyisocyanate with polyol and that of polyisocyanate with diamine. Then, an elastomer was prepared by the following prepolymer process.

Into a one-liter, three-necked, separable flask in which air being replaced by nitrogen, were placed 400 g of PTMG 1500 used in Example 1 and 134 g of MDI. The mixture was reacted with stirring at 90° C. for 3 hours to obtain a prepolymer having NCO contents of 4.09%. The propolymer (150 g) was heated at 70° C. Thereto was added 18.6 g of 3,3'-dichloro-4,4'-diaminodiphenylmethane melted at 120° C. The mixture was stirred for 30 seconds, degassed for one minute and then poured into a mold heated at 80° C. An elastomer was obtained by demolding after one hour and curing at 120° C. for 3 hours. The elastomer was aged at room temperature for 7 days. Properties of the elastomer were given in Table 1.

TABLE 1

| Temp. | Item | Ex. 1 | Ex. 2 | Ex. 3 | Com. Ex. 1 |
|---|---|---|---|---|---|
| 23° C. | Hardness JIS A | 82 | 88 | 92 | 86 |
|  | 100% Modulas (kg/cm$^2$) | 48 | 73 | 106 | 66 |
|  | Tensile strength (kg/cm$^2$) | 274 | 419 | 432 | 416 |
|  | Elongation (%) | 620 | 590 | 520 | 560 |
|  | Tear strength (kg/cm) | 69 | 94 | 122 | 92 |
| 120° C. | Tensile strength (kg/cm$^2$) | 120 | 193 | 208 | 111 |
|  | Tear strength (kg/cm) | 50 | 67 | 73 | 47 |

EXAMPLE 4

The procedure was repeated in the same manner as in Example 1 with use of 560 g (0.374 mole) of the same polyoxytetramethylene glycol (PTMG 1500 ) as used in Example 1 and 74 g (0.448 mole) of ethyl para-aminobenzoate. A light yellow liquid was obtained in a yield of 611 g which has a viscosity of 4120 cps at 25° C.

The product has an amine value of 0.684 meq/g. A total amount of amino group and hydroxyl group was 1.230 meq/g. Thus, 55.6% of terminal hydroxyl group of the starting polyol was converted to amino group.

A prepolymer was prepared in the same manner as in Comparison Example 1 with use of 200 g of the polyetherpolyol derivative and 42.8 g of 2,4 -tolylene diisocyanate (TDI-100, a product of Mitsubishi Chemical Industries Ltd.). The prepolymer has 3.87% NCO content and a viscosity of 11000 cps at 80° C. To the prepolymer (150 g) heated at 80° C. was added 17.5 g of 3,3'-dichloro-4,4'-diaminodiphenylmethane melted at 120° C. The mixture was degassed and then poured into an iron mold heated at 100° C. After the mold was placed in an oven at 100° C. for one hour, an elastomer having a thickness of 2 mm was obtained after demolding and curing at 110° C. over night. The elastomer was aged at room temperature for 7 days. Properties of the elastomer were shown in Table 2.

COMPARISON EXAMPLE 2

In order to compare with Example 4, a prepolymer having 4.32% NCO content was prepared in the same manner as in Comparison Example 1 with use of 500 g of the same polyoxytetramethylene glycol (PTMG 1500) used in Example 1 and 116 g of 2,4-tolylene diisocyanate. An elastomer was prepared in the same manner as in Example 4 with use of 150 g of the prepolymer heated at 80° C. and 19.5 g of 3,3'-dichloro-4,4'-diaminodiphenylmethane melted at 120° C. Properties of the elastomer were given in Table 2.

TABLE 2

| Temp | Item | Ex. 4 | Com. Ex. 2 |
|---|---|---|---|
| 23° C. | Hardness JIS A | 84 | 88 |
|  | 100% Modulas (kg/cm$^2$) | 69 | 77 |
|  | Tensile strength (kg/cm$^2$) | 480 | 380 |
|  | Elongation (%) | 580 | 490 |
|  | Tear strength (kg/cm) | 100 | 87 |
| 120° C. | Tensile strength (kg/cm$^2$) | 171 | 103 |
|  | Tear strength (kg/cm) | 51 | 43 |

EXAMPLE 5

The reaction was conducted in the same manner as in Example 1 with use of 502 g (0.485 mole) of polyoxytetramethylene glycol (PTMG-1000, MW 1035, a product of Mitsubishi Chemical Industries Ltd.), 160 g (0.970 mole) of ethyl para-aminobenzoate and 0.13 g of tetrabutyl titanate. A polyetherpolyol derivative which is a light yellow liquid obtained in a yield of 622 g which has a viscosity of 5600 cps at 27° C. An amine value of the product was 1.427 meq/g. A total amount of amino group and hydroxyl group was 1.594 meq/g. Thus, 89.5% of terminal hydroxyl group of the starting polyol was converted to amino group.

To the 170 g of polyetherpolyol derivative heated at 45° C. was added 35.8 g of MDI melted at 50° C. The mixture was degassed and then poured into an iron mold heated at 40° C. The pot life thereof was 9 minutes. An elastomer was obtained by demolding after one hour and curing in an oven of 120° C. for 3 hours. The elastomer was aged at room temperature for 7 days. Properties of the elastomer were shown in Table 3.

TABLE 3

| Temp | Item | Ex. 5 |
|---|---|---|
| 23° C. | Hardness JIS A | 90 |
|  | 100% Modulas (kg/cm$^2$) | 70 |
|  | Tensile strength (kg/cm$^2$) | 396 |
|  | Elongation (%) | 560 |
|  | Tear strength (kg/cm) | 86 |
| 120° C. | Tensile strength (kg/cm$^2$) | 179 |
|  | Tear strength (kg/cm) | 47 |

COMPARISON EXAMPLE 6

The procedure was repeated in the same manner as in Example 1 with use of 568 g (0.292 mole) of polyoxypropylene glycol capped with ethylene oxide at the end of the molecule (trade name, ED 56, MW 1944, a product of Mitsui Nisso Urethane Co., Ltd.), 93.2 g (0.564 mole) of ethyl para-aminobenzoate and 0.04 g of tetrabutyl titanate. A yellow liquid was obtained in a yield of 624 g which has a viscosity of 1890 cps at 27° C.

An amine value of the product was 0.804 meq/g. A total amount of amino group and hydroxyl group was 0.934 meq/g. Thus, 86.1% of terminal hydroxyl group of the starting polyol was converted to amino group.

A prepolymer having 3.30% NCO content was prepared in the same manner as in Comparison Example 1 with use of 300 g of the polyetherpolyol derivative and 49 g of tolyene diisocyanate (TDI-80, mixture of 2,4- and 2,6-tolylene diisocyanate in a ratio of 80:20, a product of Mitsubishi Chemical Industries Ltd.). To 150 g of the prepolymer heated at 65° C. was added 15 g of 3,3′-dichloro-4,4′-diaminodiphenylmethane melted at 100° C. The mixture was degassed and then poured into an iron mold heated at 75° C. The pot life thereof was 12 minute. An elastomer was obtained by demolding after one hour and curing in an oven of 110° C. over night. The elastomer was aged at room temperature for 7 days. Properties of the elastomer were given Table 4.

COMPARISON EXAMPLE 3

In order to compare with Example 6, a prepolymer having 3.37% NCO content was prepared in the same manner as in Comparison Example 1 with use of polyoxypropylene glycol (ED 56) and TDI-80. For comparison, an elastomer was prepared in the same manner as in Example 6 with use of 150 g of the prepolymer and 15.3 g of 3,3′-dichloro-4,4′-diaminodiphenylmethane. Properties of the elastomer wre shown in Table 1.

TABLE 4

| Temp. | Item | Ex. 6 | Com. Ex. 3 |
|---|---|---|---|
| 23° C. | Hardness JIS A | 72 | 66 |
|  | 100% Modulas (kg/cm$^2$) | 34 | 27 |
|  | Tensile strength (kg/cm$^2$) | 234 | 114 |
|  | Elongation (%) | 680 | 1015 |
|  | Tear strength (kg/cm) | 61 | 38 |

EXAMPLE 7

The reaction was conducted in the same manner as in Example 1 with use of 583 g (0.194 mole) of three-functional polyoxypropylenepolyol capped with ethylene oxide at the end of the molecule (SBU Polyol 0262, MW 3005, a product of Sumitomo Byer Urethane Co., Ltd.), 77 g (0.466 mole) of ethyl para-aminobenzoate and 0.33 g of tetrabutyl titanate. A polyetherpolyol derivative which is a yellow liquid was obtained in a yield of 635 g having a viscosity of 1440 cps at 25° C. An amine value of the product was 0.672 meq/g. A total amount of amino group and hydroxyl group was 0.921 meq/g. Thus, 73.0% of terminal hydroxyl group of the starting polyol was converted to amino group. To 90 g of the polyetherpolyol derivative were added 10 g of polyoxypropylenepolyol based aromatic diamine (GR-30, OHV 400 mg KOH/g, a product of Takeda Chemical Industries Ltd.), 1 g of distilled water and 0.33 g of diethylenetriamine. To the mixture heated at 30° C. was added 39 g of polymeric polyisocyanate (Sumidur 44V-20, NCO content 31.5%, a product of Sumitomo Byer Urethane Co., Ltd.) heated at 30° C. The mixture was vigorously stirred for 10 seconds, poured into a 10 cm × 10 cm paper box and was foamed. The foaming completed in about 2 minutes and a cellular article having a density of 0.086 g/cm$^3$ was obtained. Properties of the cellular article after one week were given in Table 5. Compression test was carried out according to JIS K 6401.

COMPARISON EXAMPLE 4

In order to compare with Example 7, a cellular article having a density of 0.090 g/cm$^3$ was prepared in the same manner as in Example 7 with use of SBU Polyol 0262 as a corresponding polyetherpolyol. Properties of the article were given in Table 5.

TABLE 5

| Item | Ex. 7 | Com. Ex. 4 |
|---|---|---|
| Tensile strength (kg/cm$^2$) | 1.9 | 1.1 |
| Elongation (%) | 95 | 77 |
| 25% Compression strength (kg/cm$^2$) | 0.47 | 0.19 |
| 50% Compression strength (kg/cm$^2$) | 0.65 | 0.33 |

We claim:
1. A polyurethaneurea which comprises a polymer obtained by a polyaddition reaction of (a) a polyetherpolyol derivative and (b) an at least 2-valent polyisocyanate, the polyetherpolyol derivative having at least, on average, one terminal amino group in which at least, on average, one hydroxyl group is substituted by a residue of para-aminobenzoic acid ester, and having the general formula

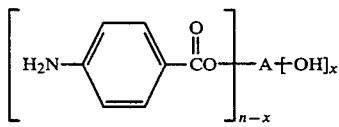

wherein n is an integer of 2 to 8, x is an average value and a positive number of 0.05n to (n−1), A is an n-valent radical obtained by removal of hydroxyl groups from an n-valent polyoxyalkylenepolyol having a molecular weight of 400 to 10,000.

2. A polyurethaneurea as defined in claim 1 wherein the para-aminobenzoic acid ester is methyl para-aminobenzoate or ethyl para-aminobenzoate.

3. A polyurethaneurea as defined in claim 1 wherein the esterification ratio is about 50 to about 95%.

4. A process for preparing a polyurethaneurea which comprises (A) reacting one mole of an n-valent polyoxyalkylenepolyol having a molecular weight of 400 to 10,000 with 0.125n to n moles of para-aminobenzoic acid alkyl ester to obtain a polyetherpolyol derivative having at least, on average, one terminal amino group in which at least, on average, one hydroxyl group is substituted by a residue of para-aminobenzoic acid ester, and having the general formula

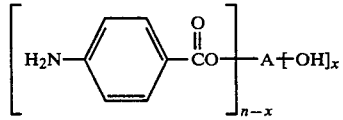

wherein n is an integer of 2 to 8, x is an average value and a positive number of 0.05n to (n−1), A is an n-valent radical obtained by removal of hydroxyl groups from an n-valent polyoxyalkylenepolyol having a molecular weight of 400 to 10,000, and (B) reacting the above polyetherpolyol derivative with at least 2-valent polyisocyanate.

* * * * *